United States Patent Office 3,748,358
Patented July 24, 1973

3,748,358
METHOD OF PURIFICATION OF N-ACETYL-p-AMINOPHENOL
Frank A. Baron, Short Hills, N.J., assignor to Mallinckrodt Chemical Works, St. Louis, Mo.
No Drawing. Filed June 16, 1970, Ser. No. 46,840
Int. Cl. C07c *103/38*
U.S. Cl. 260—562 P          4 Claims

ABSTRACT OF THE DISCLOSURE

N-acetyl-p-aminophenol is purified by treating an aqueous solution thereof with charcoal which has been preliminarily washed with an acidic solution, and crystallizing pure N-acetyl-p-aminophenol. The iron content of the N-acetyl-p-aminophenol is reduced by including a chelating agent in the crystallization solvent.

The present invention relates to the purification of N-acetyl-p-aminophenol. More specifically, the invention relates to a method whereby crude N-acetyl-p-aminophenol may be treated in order to obtain a purified material.

N-acetyl-p-aminophenol, commonly known as Acetaminophen, is a well known and highly useful pharmaceutical compound. For example, N-acetyl-p-aminophenol is commonly employed as a long-term analgesic. In addition to its many uses in the pharmaceutical field it is also employed as a stabilizer for various materials, e.g., hydrogen peroxide.

In order to qualify for use in the pharmaceutical field, and indeed in many non-pharmaceutical applications, it is necessary that the N-acetyl-p-aminophenol meet the National Formulary (N.F.) specifications. Unfortunately however, N-acetyl-p-aminophenol, by whatever method produced, often contains numerous color-bodies and color-forming impurities which are exceedingly difficult to remove therefrom. In addition, color-bodies are often formed during processing of white, pure N-acetyl-p-aminophenol.

Generally, N-acetyl-p-aminophenol is produced by the acetylation of p-aminophenol. Of the various methods known for the preparation of p-aminophenol, however, all yield a product containing significant amounts of impurities which are difficult to remove. A particularly advantageous method for the preparation of p-aminophenol involves the catalytic hydrogenation of nitrobenzene in aqueous sulfuric acid as described in U.S. Patent No. 3,386,416, issued May 14, 1968. The color-forming impurities associated with the p-aminophenol produced by this and other processes may, however, be carried over into the N-acetyl-p-aminophenol upon acetylation of the p-aminophenol.

The color of N-acetyl-p - aminophenol products, produced in this manner, range in color from a pink to a light gray to a blue-black, due to the presence of these color-bodies. Needless to say, N-acetyl-p-aminophenol, which is a white crystalline product in its pure state, does not satisfy the N. F. requirements when these color-bodies are present therein.

The exact nature and identity of these colored impurities in N-acetyl-p-aminophenol is not precisely known. While not wishing to be bound by any particular theory, it is believed that these impurities comprise quinones, quinonimines and meri-quinonimines which are produced by the oxidation of p-aminophenol derivatives. Some or all of the p-aminophenol present may have its origin in hydrolysis of N-acetyl-p-aminophenol. The ease with which aminophenols oxidize to yield these colored compounds is reported in U.S. Patent No. 2,013,394. These oxidations undoubtedly occur as side reactions during preparation or work-up of p-aminophenol. Notwithstanding the identity of these color-bodies they are difficult to remove from the p-aminophenol and, as they are also present in the acetylated product N-acetyl-p-aminophenol, perhaps as a result of hydrolysis followed by oxidation, they are no less difficult to eliminate therefrom.

In order to meet the high N.F. purity standards required for pharmaceutical uses, various methods for the purification of N-acetyl-p-aminophenol have been suggested. These methods, however, often involve extensive and complicated recrystallizations, distillations, solvent extractions, etc., requiring elaborate and costly apparatus and the expenditure of extended periods of time. A typical method for the purification of N-acetyl-p-aminophenol is disclosed in U.S. Patent No. 3,042,719.

Another purification method comprises acetylating N-acetyl-p-aminophenol in the presence of certain compounds which operate to reduce the color of the ultimate product. These compounds generally comprise salts of inorganic sulfur acids, particularly, the oxygen acids of sulfur wherein the sulfur is in a lower valence state when in sulfuric acid, e.g., $Na_2S_2O_4$, etc. However, the color reducing stabilizing agents included in the acylation reaction mixtures according to the above described purification techniques are incapable of satisfactorily repressing the sensitivity of spurious p-aminophenol to these side reactions.

It is an object of the present invention to provide a method for the purification of crude N-acetyl-p-aminophenol which is more efficient than those heretofore employed in the prior art at a significant savings in time and expense.

Since there exists an intensive and competitive search for economical and simple methods for the preparation and purification of N-acetyl-p-aminophenol which meets the N.F. requirements, even slight increases in the efficiency of these methods represent significant improvements over the prior art.

SUMMARY OF THE INVENTION

These and other objects of the present invention are achieved by eliminating impurities from crude N-acetyl-p-aminophenol and precluding formation of impurities therein by treating an aqueous solution of N-acetyl-p-aminophenol with carbon which has been preliminarily treated with an acidic solution. This carbon treatment of crude N-acetyl-p-aminophenol with the thus treated carbon results in a product having a higher degree of purity and whiteness than N-acetyl-p-aminophenol purified according to the hereinbefore described prior art methods. Furthermore, the purified N-acetyl-p-aminophenol is obtained with the expenditure of considerably less time and expense than the above described complicated and inefficient prior art purification methods.

A further embodiment of the invention includes the addition of a metal-chelating agent in the acid wash, or in the N-acetyl-p-aminophenol solution to remove the metallic impurities normally associated therewith.

DETAILED DESCRIPTION OF THE INVENTION

Carbon treatment of the crude N-acetyl-p-aminophenol solution in the manner described above operates to remove a large percentage of the color-bodies present therein. These impurities include not only those inherently present in the p-aminophenol but also those impurities which may arise out of the acetylation reaction itself, and from the subsequent hydrolysis of N-acetyl-p-aminophenol during processing.

The method of the present invention is particularly adapted for the removal of colored impurities from N-acetyl-p-aminophenol which impurities are present therein as a result of the acetylation of impure p-aminophenol produced by the catalytic hydrogenation of nitrobenzene in aqueous sulfuric acid as described in U.S. Pat. No. 3,386,416. It is to be understood, however, that the method of the present invention is also suitable for the removal of colored impurities from N-acetyl-p-aminophenol by whatever process produced.

It is the essence of the invention that the carbon employed in decolorization of crude N-acetyl-p-aminophenol must be preliminarily treated (washed) with an acidic solution prior to its being contacted with the N-acetyl-p-aminophenol. The precise mechanism by which this acid pre-treatment renders the carbon particularly effective for the removal of colored impurities is not definitely known at present. (Certain acid washes extract a soluble purple principle from charcoal which may be the salt of a metal. The extraction of the purple substance from carbon is not a necessary feature of this invention.) It is expected that the mechanism of the carbon pre-treatment resides in the removal or deactivation of a harmful or detrimental substance present in the carbon, e.g. trace metals known to be present in the carbon, e.g. in activated carbon; and unless these substances are removed from the carbon, they either (a) catalyze hydrolysis or oxidation of the N-acetyl-p-aminophenol thereby introducing color into the N-acetyl-p-aminophenol solution, or (b) dissolve in the small quantities of acetic acid usually present in the cake of crude N-acetyl-p-aminophenol, thereby imparting color to the N-acetyl-p-aminophenol. In any event, it has been found that where carbon which has not been pretreated with an acidic solution is utilizid to decolorize crude N-acetyl-p-aminophenol, the ultimately recovered N-acetyl-p-aminophenol is obtained as a colored solid, rather than as the pure white crystalline material such as is recovered from solutions contacted with the acid-treated carbon.

Moreover, if unwashed carbon is employed to treat an aqueous N-acetyl-p-aminophenol solution of pH less than 2.2, the incidence of pink color formation in the resultant N-acetyl-p-aminophenol is increased.

Any substantially pure carbon absorbent material may be employed in the method of the invention. Exemplary of the carbons which may be utilized are charcoal, bone black, etc. Particularly preferred are the so-called activated carbons. Activated carbons are well known in the prior art and are usually produced by heating ordinary carbon to high temperatures, e.g. 800–900° C., in the presence of steam or carbon dioxide and a hygroscopic substance such as zinc chloride, phosphoric acid or sodium sulfate. The activated carbons are particularly effective for the removal of colored impurities from crude N-acetyl-p-aminophenol.

The acid pre-treatment of the carbon may advantageously be effected by merely contacting the carbon with an acidic solution at room temperature. The carbon may be slurried or suspended in the acidic solution and then washed with water to remove the acid. However, not just any strong organic or inorganic acid may be employed to pre-treat the carbon. Nitric acid for example, does not work well, nor does aqueous sulfamic acid. Among the suitable acids which may be utilized, although not limited thereto, are acetic acid, sulfuric acid, phosphoric acid, hydrochloric acid, formic acid, aqueous citric acid, aqueous ethylenediaminetetraacetic aicd and its various salts. The acid is preferably employed in dilute aqueous form; however, it is to be understood that acid solutions of various concentrations may also be employed. Generally, any acid solution having a pH below about 4.5 may be utilized.

Mixtures of acids can also be used. Especially useful are mixtures in which one of the acids is a chelating agent, and the second acid is a strong acid or an acid which has solvent properties. For example, a mixture of formic acid and the chelating acid gluconic acid is very effective as a carbon wash solution. Gluconic acid alone is only marginally effective. Another effective mixture is aqueous hydrochloric acid-gluconic acid.

Following the acid pre-treatment, it is necessary to wash the carbon completely free of the acid material to avoid contamination of the N-acetyl-p-aminophenol. The washing of the acid-treated carbon may be carried out according to any convenient method. Advantageously, the acidic solution containing the slurried carbon may be filtered to remove the acid and the filter containing the acid-treated carbon washed repeatedly with water until no trace of acid appears in the wash water.

The acid pre-treated carbon is preferably immediately contacted with the aqueous solution of crude N-acetyl-p-aminophenol to be purified. If the N-acetyl-p-aminophenol to be purified is a freshly prepared crude cake obtained from the acetylation of crude p-aminophenol, followed by crystallization and separation from the reaction mixture, then the treatment with acid pre-treated carbon in accordance with the method of the present invention serves to remove those impurities inherited from the process employed to prepare the p-aminophenol starting material. The method of the invention also removes those impurities inherent in the freshly prepared N-acetyl-p-aminophenol, which slowly oxidize to produce color-bodies.

Where the crude N-acetyl-p-aminophenol to be purified is not freshly prepared but has on standing developed color-bodies, the method of the present invention effectively eliminates these colored materials. In addition, the process of the invention serves to remove from the crude N-acetyl-p-aminophenol those impurities which are colored or yield color-bodies upon standing that are produced during the acetylation reaction.

Of equal or greater importance, utilization of the acid-washed carbon of this invention during recrystallization of crude or white N-acetyl-p-aminophenol from water prevents the formation of new color-bodies.

The amount of carbon employed to purify the crude N-acetyl-p-aminophenol is not critical and depends in each application upon the quantity of impurities present therein. Generally, however, an amount of acid pre-treated carbon ranging from about 0.1 to about 5% by weight based on the amount of N-acetyl-p-aminophenol is sufficient to remove the color-forming impurities normally associated therewith.

According to a further embodiment of the invention, iron or other metallic impurities which are often associated with p-aminophenol and N-acetyl-p-aminophenol may be simultaneously removed therefrom along with the color-bodies by including in the solution from which the N-acetyl-p-aminophenol is crystallized a small amount of a chelating agent, e.g. citric acid, gluconic acid, ethylenediaminetetraacetic acid derivatives, etc. The amount of chelating agent employed is not critical and depends in each instance upon the amount of metal present in the N-acetyl-p-aminophenol to be purified. Generally, an amount of chelating agent ranging from about .01 to about 1% by weight based on the weight of N-acetyl-p-aminophenol is sufficient to remove any metallic impurities which may be associated therewith.

The purification method of the present invention is advantageously carried out by intimately admixing in a suitable container the crude N-acetyl-p-aminophenol, the chelating agent, the acid pre-treated carbon and sufficient water to dissolve the N-acetyl-p-aminophenol solids upon heating and to slurry the mixture. The pH of the mixture (solution) should preferably exceed 2.2. The mixture is then heated to an elevated temperature in the range of from about 75 to about 95° C. for a time sufficient to ensure intimate contact between the carbon and the N-acetyl-p-aminophenol solution. Subsequently, the carbon is removed from the N-acetyl-p-aminophenol solution-carbon slurry, e.g., by centirfugation, filtration, etc. The N-acetyl-p-aminophenol solution is then slowly cooled, preferably under an inert gas to ambient conditions, preferably with stirring, and allowed to stand until such time as the purified N-acetyl-p-aminophenol crystallizes therefrom.

The N-acetyl-p-aminophenol crystals may be collected according to any convenient method, i.e. filtration, decantation, centrifugation, etc., washed and dried. The N-acetyl-p-aminophenol is thus produced in a highly purified form meeting the N.F. specifications with an expenditure of minimum time and expense.

The invention will be illustrated by the following non-limiting examples.

The N-acetyl-p-aminophenol used in the examples was prepared as follows:

109 g. of crude p-aminophenol prepared by the method described in Example 1 of U.S. Pat. 3,383,416 was dissolved in 635 cc. of a 10% acetic acid solution. The solution was heated to 90° C. under an atmosphere of nitrogen. 4.3 g. of activated charcoal (Nuchar C-190-A) was added to the hot p-aminophenol solution and the mixture heated to 95° C. and held there for 6 min. The mixture was then filtered through a funnel coated with diatomaceous earth to remove the charcoal. The charcoal-containing filter was washed with 40 cc. of hot water.

The filtrate was then cooled to 35-40° C. under an atmosphere of nitrogen and 122 g. of acetic anhydride were added slowly thereto with stirring. The mixture was then heated to 80-85° C. for 10 minutes. The mixture was then slowly cooled to 15-20° C. while stirring. The N-acetyl-p-aminophenol which crystallized was collected by filtration.

EXAMPLE 1

175 g. of a freshly prepared N-acetyl-p-aminophenol cake (80% N-acetyl-p-aminophenol), 420 g. of distilled water and 1 g. of citric acid are intimately admixed at room temperature. Four grams of charcoal (Nuchar C-190-A) are slurried in a beaker with sufficient tech. acetic acid to cover the carbon. The mixture is intimately admixed, filtered on a buchner funnel and washed with distilled water until no trace of acid appears in the wash water. The thus treated carbon is added to the N-acetyl-p-aminophenol slurry and the mixture heated with stirring to 95° C. and held at that temperature with stirring for 10 minutes. The resulting solution is filtered to remove the carbon. The carbon cake is washed with 15 cc. of hot distilled water and the wash water added to the filtrate.

The filtrate is then cooled with stirring until the temperature thereof reaches 15-20° C. Stirring is continued for an additional two hours. The crystals of N-acetyl-p-aminophenol are collected on a filter, washed with 50 cc. of cold distilled water and dried in a vacuum oven at 85° C. The thus produced N-acetyl-p-aminophenol is a white crystalline product which meets N.F. specifications.

EXAMPLE 2

The process of Example 1 is carried out except that 85% $H_3PO_4$ is employed to treat the carbon. An N-acetyl-p-aminophenol product having an equivalent degree of purity is also obtained.

EXAMPLE 3

The process of Example 1 is carried out except that 37% hydrochloric acid is employed to treat the carbon. An N-acetyl-p-aminophenol product having an equivalent degree of purity is also obtained.

EXAMPLE 4

The process of Example 1 is carried out except that dilute aqueous $H_2SO_4$ is employed to treat the carbon. An N-acetyl-p-aminophenol product having an equivalent degree of purity is also obtained.

EXAMPLE 5

The process of Example 1 is carried out except that aqueous formic acid is employed to treat the carbon. An N-acetyl-p-aminophenol product having an equivalent degree of purity is also obtained.

EXAMPLE 6

The process of Example 1 is carried out except that an aqueous solution of a mixture of formic and gluconic acids are employed to treat the carbon. An N-acetyl-p-aminophenol product having an equivalent degree of purity is also obtained.

EXAMPLE 7

The process of Example 1 is carried out except that aqueous citric acid (saturate solution) is employed to treat the carbon. An N-acetyl-p-aminophenol product having an equivalent degree of purity is also obtained.

EXAMPLE 8

The process of Example 1 is carried out except that an aqueous saturated solution of ethylenediaminetetraacetic acid is employed to treat the carbon. An N-acetyl-p-aminophenol product having an equivalent degree of purity is also obtained.

EXAMPLE 9

The process of Example 1 is carried out except that a saturated aqueous solution of disodium salt of ethylenediaminetetraacetic acid is employed to treat the carbon. An N-acetyl-p-aminophenol product having an equivalent degree of purity is also obtained.

EXAMPLE 10

The process of Example 1 is carried out except that a saturated aqueous solution of trisodium salt of ethylenediaminetetraacetic acid is employed to treat the carbon. An N-acetyl-p-aminophenol product having an equivalent degree of purity is also obtained.

EXAMPLE 11

The process of Example 1 is carried out except that an aqueous solution of the non-acidic salt, tetrasodium salt of ethylenediaminetetraacetic acid is employed to treat the carbon. An N-acetyl-p-aminophenol product having an equivalent degree of purity is also obtained.

EXAMPLE 12

The process of Example 1 is carried out except that an aqueous solution of the non-acidic salt, penta sodium diethylenetriaminepentaacetate, is employed to treat the carbon. An N-acetyl-p-aminophenol product having an equivalent degree of purity is also obtained.

What is claimed is:

1. A method for purifying crude N-acetyl-p-aminophenol derived by reacting p-aminophenol, containing oxidation products thereof, with acetic anhydride, acetic acid or a mixture thereof, which comprises contacting an aqueous solution of the crude product and citric acid, gluconic acid, penta sodium diethylenetriaminepentaacetate, ethylenediaminetetraacetic acid or sodium salt thereof as iron-chelating agent with carbon, which has been preliminarily contacted with acetic, sulfuric, phosphoric, hydrochloric, formic, aqueous citric or aqueous ethylenediaminetetraacetic acid, or a mixture thereof as a pre-treatment acid, and washed with water to substantially displace the acid, at a pH of above 2.2 and a temperature of from about 75 to about 95° C., removing the carbon from the resultant aqueous solution, cooling the aqueous solution to substantially ambient conditions to crystallize purified N-acetyl-p-amiophenol and separating the purified product.

2. The method according to claim 1 wherein said pre-treatment acid is acetic acid.

3. The method according to claim 1 wherein said pre-treatment acid is phosphoric acid.

4. The method according to claim 1 wherein said carbon is activated charcoal.

(References on following page)

References Cited

UNITED STATES PATENTS

| | | | |
|---|---|---|---|
| 1,539,775 | 5/1925 | Sauer | 252—444 |
| 2,300,600 | 11/1942 | Steely | 252—444 |
| 2,369,139 | 2/1945 | Deitz | 252—444 |
| 3,113,150 | 12/1963 | Young | 260—562 |

Weissburger: Technique of Organic Chemistry, vol. V, "Adsorption and Chromatography," pp. 190–192 (1951).

Miller: J. Phys. Chem., vol. 50, pp. 1031–36 and 1162–69 (1926).

HARRY I. MOATZ, Primary Examiner

U.S. Cl. X.R.

260—439